Patented Apr. 22, 1941

2,239,565

UNITED STATES PATENT OFFICE 2,239,565

DIAZO-IMINO COMPOUNDS

Eugene A. Markush, Jersey City, and Julius Miller, Newark, N. J., and John J. Malawista, Brooklyn, N. Y., assignors to Pharma Chemical Corporation, New York, N. Y., a corporation of New York No Drawing. Application December 1, 1939, Serial No. 307,084

7 Claims. (Cl. 260—140)

This invention relates to insoluble dyes and particularly to compounds adaptable for coloring or dyeing cellulose fibers. In United States Letters Patent, Number 2,162,960, June 20, 1939, there is described the production of bis-diazo-diamino compounds from the condensation of diazo or tetrazo bodies with an aromatic diaryl compound which is a primary diamine. We have now found that, by condensing aromatic diazo or tetrazo compounds with a bis-imino-diaryl compound, bis-diazoimino bodies are produced which when treated with an aqueous solution of an acid are split into the original diazo or tetrazo compound and the aromatic diazo secondary diamine with much greater ease and rapidity than those described in the above-mentioned patent. Consequently, when these new bis-diazo-diamino compounds are mixed with suitable quantities of azo dye coupling components, valuable azo dyes may be produced.

The general formula for the compounds of our invention is:

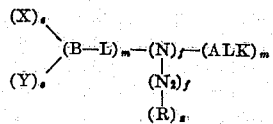

in which B is a benzene or diaryl residue; L is a member of the group consisting of O, S, $CH_2$,

$-N=N-$, $-O-CH_2-CH_2-O-$, $-CH=CH-$, $SO_2$, and

connecting two benzene residues when B is a diaryl residue other than diphenyl and is equal to zero when B is a monoaryl residue or diphenyl residue and which is not disassociated when the diphenyl compound is coupled with the azotized aromatic amine, X is a sulfo group, Y is a carboxyl group, $m$ is 1 or 2, $e$ is 2 or 4, $f$ is 2 or 4, ALK is an alkyl residue, R is a residue of a diazotized member of the group consisting of aromatic monoamines and aromatic diamines, and $z$ is 2 or 4 when R is a monoamine and 1 or 2 when R is a diamine residue.

L is the connecting link between the two aryl groups of such character that it is not disassociated when the diaryl compound is coupled with the azotized aromatic amine and among which substitutions for L are: O, S, $CH_2$,

$-N=N-$, $O-CH_2-CH_2-O$, $CH=CH$, $SO_2$, and

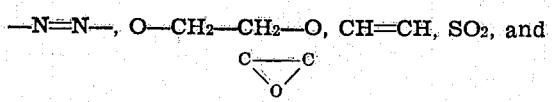

The following are formulas of some of our compounds:

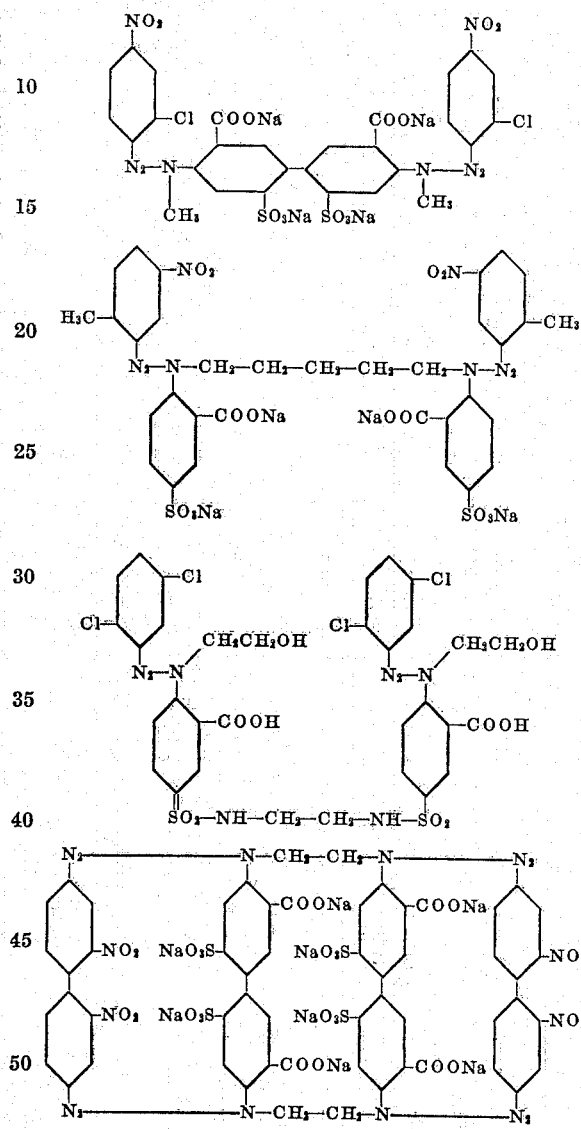

*Example I*

168 parts of 5-nitro-2-amino-anisol are dissolved in 700 parts of water and 350 parts of muriatic acid 20° Bé. at 90° C. are added in a small stream with constant stirring to 1500 parts of crushed ice. The fine paste is diazotized by pouring a solution of 70 parts sodium nitrite in 250 parts of water and stirring until a clear solution results. The solution is filtered if not clear. The diazo is then added in portions to an 8° C. solution of 310 parts 6-6' disulfonic sodium, 3-3' dicarboxylic, 4-4' bis N-monoethanol amino diphenyl (prepared by condensing under suitable conditions 6-6' disulfonic, 3-3' dicarboxylic 4-4' dichlor diphenyl with monoethanol amine) in about 2000 parts water and 200 parts sodium carbonate. The condensation proceeds smoothly and rapidly which can be readily followed by spot testing for diazonium with an alkaline solution of 1-amino-8-naphthol 3-6-disulfonic acid. Upon completion of the reaction, the mass is treated with sodium chloride, whereupon the orange crystalline bis-diazo-imino compound precipitates. It is filtered, pressed well, and dried. Its formula probably is:

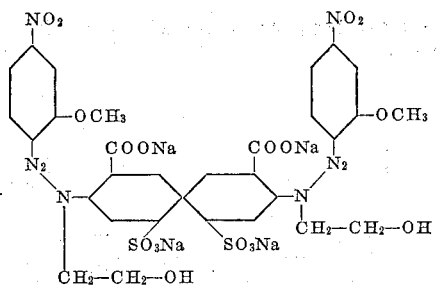

This, when mixed with beta hydroxy acid arylides and applied on the fiber and subjected to a much shorter acid treatment than the compound described in Example III of United States Letters Patent, Number 2,162,960, yields bluish Bordeaux shades.

*Example II*

1.1 gram moles of 4-4' disulfonic sodium salt, 2-2' dicarboxy N-N' phenyl-ethylene-diamine are dissolved in water and 200 grams sodium carbonate and cooled to 8° C. To this is added the diazonium solution prepared as follows: 162 grams of 2-5 dichlor aniline are suspended in 200 parts of water and heated until the crystals have melted. Under vigorous stirring, 464 grams of hydrochloric acid 20 Bé. are added and the whole mass cooled to 5° C. by the addition of crushed ice. 70 grams sodium nitrite in 300 grams of water are added and stirring maintained until a clear solution of diazonium has resulted.

Upon completion of the condensation, which is indicated by spotting as in Example I, the product is precipitated with sodium chloride. The cream colored precipitate is filtered, pressed well, and dried. Titration, carried out by treating an aqueous solution of a sample with acid and coupling the liberated diazonium with beta naphthol, indicated a yield of 80% of theory. The probable formula is:

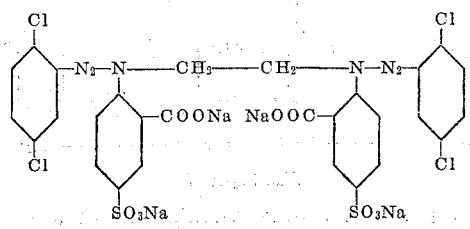

This compound when mixed with betaoxy-naphthoic acid arylides and subjected to acid treatment by methods well known in the art yields bright orange to yellowish red shades having excellent properties.

*Example III*

152 parts of 5-nitro-2-amino toluene are dissolved in 700 parts of water and 350 parts 20 Bé. hydrochloric acid at 95° C. The hot solution is dripped slowly with good stirring into 1500 parts of crushed ice. 70 parts sodium nitrite in 250 parts of water are then added quickly. Stirring is maintained until a clear diazo solution is obtained.

This is now added in portions, as described in previous examples, to a solution of 277 parts 6-6' disulfonic sodium salt 3-3' dicarboxy 4-4' mono-N-methyl benzidine and 200 parts sodium carbonate. The condensation is carried out at 8°–10° C. and upon completion, by addition of sodium chloride, the bis diazoimino compound is precipitated. Upon filtering and drying there is obtained a bright orange powder.

Its probable formula is:

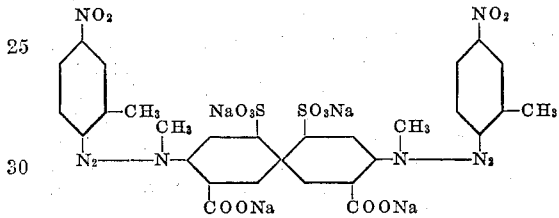

When mixed with beta oxy naphthoic acid ortho toluidid and aged for a very short time with acid, there is obtained a bright bordeaux.

Among the other aromatic amines, the following diazotized compounds are suitable for the production of the compounds of our invention: Nitro-anilines, nitro-toluidines, nitro-anisidines, nitro-phenetidines, nitro-xylidines, dichlor-anilines, dichlor-toluidines, trichlor-anilines, nitrochlor-anilines, toluidines, anisidines, dinitro-anilines, chloranilines, chlor-toluidines, chlor-anisidines, phenetidines, amino-diphenyl-ether, 2.5-dichlor-1-amino-benzene, 4-chlor-2-amino-1-methoxy-benzene, 4-chlor-2-amino-1-methylbenzene, 4.5-dichloro-2-amino-1-methylbenzene, 5-nitro-2-amino-1-methyl-benzene, 4-chlor-2-amino-1-methylbenzene, 2.5-dichlor-1-aminobenzene, 2.5-dichlor-4-amino-1-methyl-benzene, 4-chlor-2-amino-1-methylbenzene, 4-nitro-2-amino-1-methoxy-benzene, 5-nitro-2-amino-1-methoxybenzene, 3-amino-4-methoxy-6-nitro-1-methyl-benzene, 6-amino-4-benzoyl-amino-1.3-dimethoxydiphenyl, 3-amino-4-methoxy-6-benzoylamino-1-methylbenzene, 6-amino-3-benxoylamino-4-ethoxy-1-methoxybenzene, 4-nitro-4'-amino-2'.5'-dimethoxyazo-benzene, alpha-naphthylamine, chlor-alpha-naphthylamine, beta-naphthylamine, nitronaphthylamine, and amino anthraquinone.

Among the other diaryl compounds such as the following are also suitable:

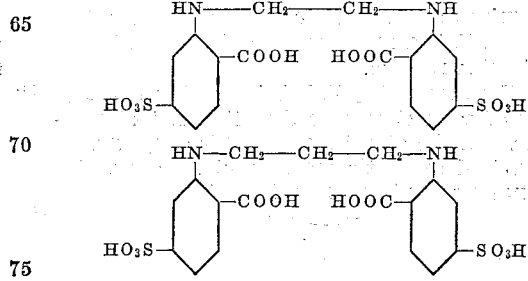

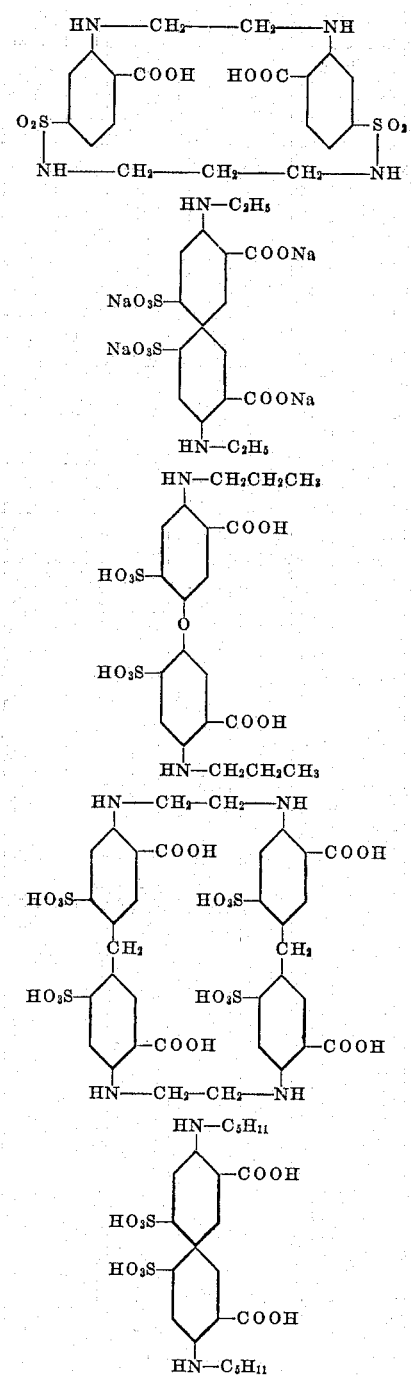

Among the coupling components suitable for use in the processes of our invention are the following: Diacetoacetyl-o-tolidide, 2-hydroxy-naphthalene-3-carboxylicacid-o-toluidide, sodium compound of 2-hydroxy-naphthalene-carboxylic acid-o-phenetidide, 2-hydroxy-naphthalene-3-carboxylic acid-o-anisidide, 2-hydroxy-naphthalene-3-carboxylic acid-2-methyl-4'-methoxyanilide, sodium compound of 2-hydroxy-naphthalene-3-carboxylic acid-o-toluidide, 2-hydroxy-naphthalene-3-carboxylic acid-alpha-naphthylamide, 2-hydroxynaphthalene-3-carboxylic acid-2'5'-dimethoxyanilide, sodium compound of 2-hydroxynaphthalene-3-carboxylic acid-anilide, sodium compound of 2-hydroxycarbazole-o-carboxylic acid-2'-toluidide, phenyl-methyl-pyrazolon, barbituric acid, and ethylacetoacetate.

We do not limit ourselves to the materials, quantities, times, temperatures, and steps of procedure specifically set forth as these are given solely for the purpose of clearly defining our invention.

What we claim is:

1. Compounds possessing dyeing properties and represented by the following formula:

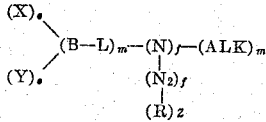

in which B is a residue of a member of the group consisting of members of the benzene series and of the diaryl series, L is a member of the group consisting of O, S, $CH_2$,

$-N=N-$, $-O-CH_2-CH_2-O-$, $-CH=CH-$, $SO_2$, and

connecting two benzene residues when B is a diaryl residue other than diphenyl and is equal to zero when B is a monoaryl residue or diphenyl residue and which is not disassociated when the diphenyl compound is coupled with the azotized aromatic amine, X is a sulfo group, Y is a carboxyl group, $m$ is 1 or 2, $e$ is 2 or 4, $f$ is 2 or 4, ALK is an alkyl residue, R is a residue of a diazotized member of the group consisting of aromatic monoamines and aromatic diamines, and $z$ is 2 or 4 when R is a monoamine and 1 or 2 when R is a diamine residue.

2. Compounds possessing dyeing properties and represented by the following formula:

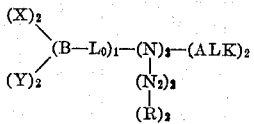

in which B is a residue of a member of the group consisting of members of the benzene series and of the diaryl series, L is a member of the group consisting of O, S, $CH_2$,

$-N=N-$, $-O-CH_2-CH_2-O-$, $-CH=CH-$, $SO_2$, and

connecting two benzene residues when B is a diaryl residue other than diphenyl and is equal to zero when B is a monoaryl residue or diphenyl residue and which is not disassociated when the diphenyl compound is coupled with the azotized aromatic amine, X is a sulfo group, Y is a carboxyl group, ALK is an alkyl residue, and R is a residue of a diazotized member of the group consisting of aromatic monoamines and aromatic diamines.

3. Compounds possessing dyeing properties and represented by the following formula:

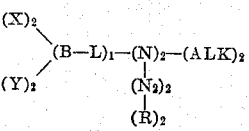

in which B is a residue of a member of the group consisting of members of the benzene series and of the diaryl series, L is a member of the group consisting of O, S, CH₂,

—N=N—, —O—CH₂—CH₂—O—, —CH=CH—, SO₂, and

connecting two benzene residues when B is a diaryl residue other than diphenyl and is equal to zero when B is a monoaryl residue or diphenyl residue and which is not disassociated when the diphenyl compound is coupled with the azotized aromatic amine, X is a sulfo group, Y is a carboxyl group, ALK is an alkyl residue, and R is a residue of a diazotized member of the group consisting of aromatic monoamines and aromatic diamines.

4. Compounds possessing dyeing properties and represented by the following formula:

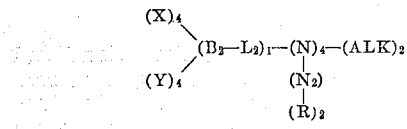

in which B is a residue of a member of the group consisting of members of the benzene series and of the diaryl series, L is a member of the group consisting of O, S, CH₂,

—N=N—, —O—CH₂—CH₂—O—, —CH=CH—, SO₂, and

connecting two benzene residues when B is a diaryl residue other than diphenyl and is equal to zero when B is a monoaryl residue or diphenyl residue and which is not disassociated when the diphenyl compound is coupled with the azotized aromatic amine, X is a sulfo group, Y is a carboxyl group, ALK is an alkyl residue, and R is a residue of a diazotized member of the group consisting of aromatic monoamines and aromatic diamines.

5. A compound formed by combining a diazotized member of the group consisting of aromatic monoamines and aromatic diamines with 4-4' disulfo, 2-2' dicarboxy, N-N' diphenyl ethylene, which dye compounds are adapted to dye cellulose fibers and which upon acid treatment are split into the original diazo or tetrazo compounds.

6. A compound formed by combining a diazotized member of the group consisting of aromatic monoamines and aromatic diamines with 6-6' disulfo, 3-3' dicarboxy —N—N— diphenyl dimethyl, which dye compounds are adapted to dye cellulose fibers and which upon acid treatment are split into the original diazo or tetrazo compounds.

7. A compound formed by combining a diazotized member of the group consisting of aromatic monoamines and aromatic diamines with 6-6' disulfonic, 3-3' dicarboxy N-N diphenyl-diethylene, which dye compounds are adapted to dye cellulose fibers and which upon acid treatment are split into the original diazo or tetrazo compounds.

EUGENE A. MARKUSH.
JULIUS MILLER.
JOHN J. MALAWISTA.